United States Patent [19]

Otsubo

[11] Patent Number: 4,496,604
[45] Date of Patent: Jan. 29, 1985

[54] POWDERY INSTANT MILK COMPOSITION AND METHOD OF PRODUCING THE SAME

[75] Inventor: Tooichi Otsubo, Tokyo, Japan

[73] Assignee: The National Federation of Dairy Co-Operative Associations, Tokyo, Japan

[21] Appl. No.: 454,872

[22] Filed: Dec. 30, 1982

[30] Foreign Application Priority Data

Jan. 6, 1982 [JP] Japan ................................ 57-800

[51] Int. Cl.³ .............................................. A23C 9/152
[52] U.S. Cl. ................................................... 426/588
[58] Field of Search ................ 426/580, 588, 518, 519

[56] References Cited

U.S. PATENT DOCUMENTS 3,434,846  3/1969  Scott ..................................... 426/580
3,522,054  7/1970  Cavroy et al. ....................... 426/588
4,031,263  6/1977  Kalopissis et al. .................. 426/588
4,164,594  8/1979  Jackson et al. ................. 426/580 X

OTHER PUBLICATIONS

The Condensed Chemical Dictionary, 9th ed., Hawley, 1977, p. 170.

Primary Examiner—Arthur L. Corbin
Attorney, Agent, or Firm—Frishauf, Holtz, Goodman & Woodward

[57] ABSTRACT

A powdery instant milk composition of crumb structure containing 0.5 to 3% by weight, based on the whole composition of propylene glycol. A method for producing a powdery instant milk composition including the steps of adding 0.5 to 3% by weight or propylene glycol to a powdery milk or substituted powdery milk composition and kneading the mixture to form lumps of crumb structure.

14 Claims, 2 Drawing Figures

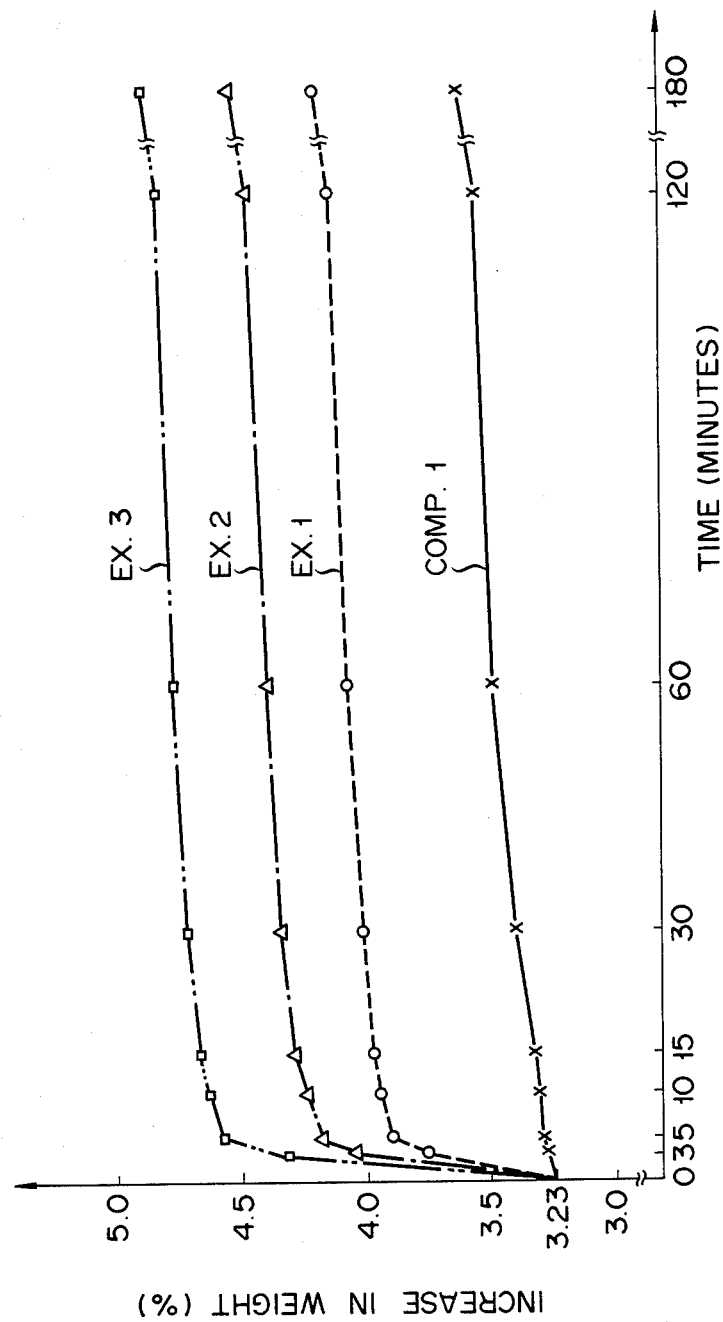

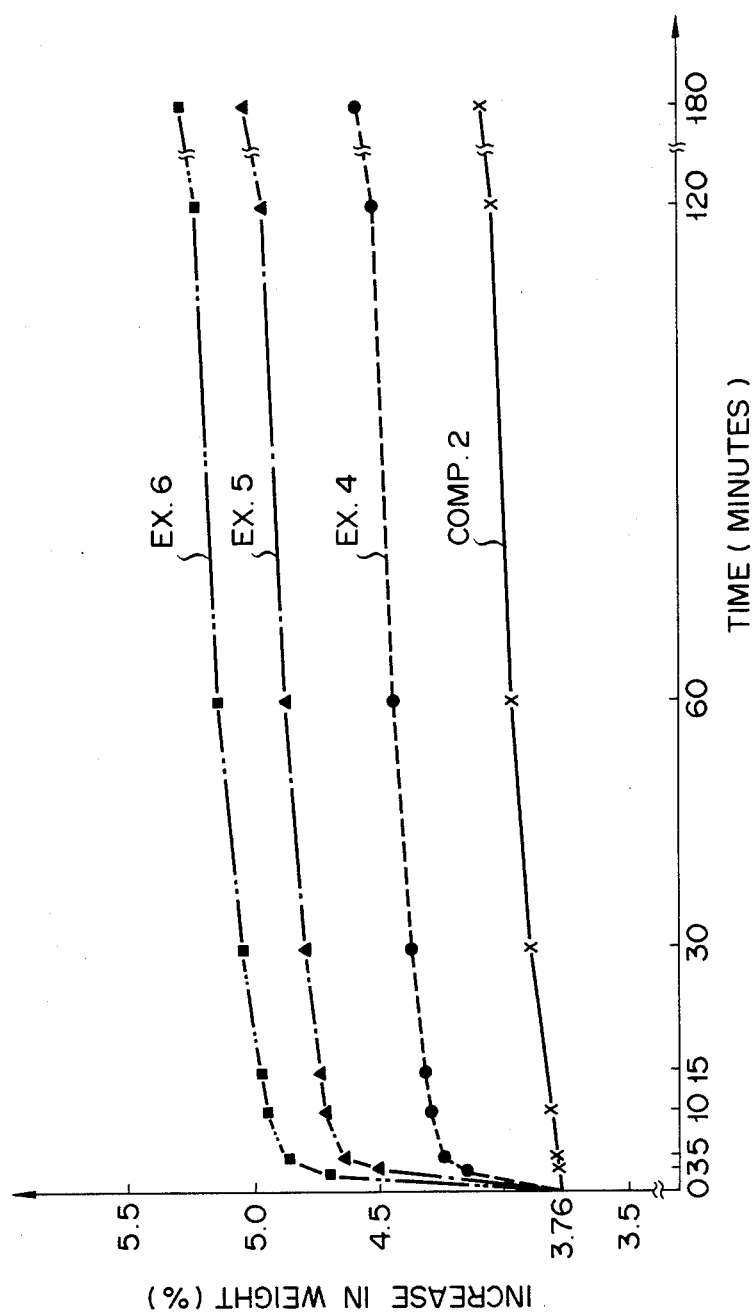

POWDERY INSTANT MILK COMPOSITION AND METHOD OF PRODUCING THE SAME

BACKGROUND OF THE INVENTION

This invention relates to a powdery instant milk composition of improved quality and a method of producing the composition.

Since powdery milk such as ordinary powdery skim milk or whole milk powder is low in solubility in water, a powdery instant milk (or a quickly dissolving powdery milk) has been produced by special methods.

Two factors are involved in the solubility of powdery milk; namely, the solubility is determined by the physical properties of the powder (first factor) and crystallization of lactose contained in the powdery milk (second factor). In general, powdery milk is in the form of a dense powder of single grain structure. The capillary space within the powder is very small. If put in water, the contact portion of the powder with water is rapidly made wet to form a highly viscous sirup layer, with the result that the capillary space leading into the inner region of the powdery means is plugged to prevent water from permeating into the powdery mass. It follows that the powdery milk forms lumps and is not dissolved in water. In contrast, a quickly dissolving powdery milk has a crumb structure having a large capillary space within the powdery mass. Thus, water promptly permeates into the powdery mass, allowing the powdery milk to dissolve in water without forming undissolved powder lumps.

Crystallization of lactose (second factor) is also important. The lactose contained in the ordinary powdery milk is amorphous and so high in moisture-absorbing property that the powdery milk, if put in water, promptly absorbs water to form a sirup layer. As described previously, the sirup layer causes formation of undissolved powder lumps. In contrast, a large portion of lactose contained in the quickly dissolving powdery milk is crystallized. The crystallization brings about capillary space network formed of cracks extending along edges and side surfaces of very small crystals, with the result that water promptly permeates into the powdery mass. It follows that a sirup layer is not formed on the powdery mass surface and the powdery milk is promptly dissolved in water. The crystalline lactose contained in the quickly dissolving powdery milk has two optical isomers, i.e., $\alpha$-lactose and $\beta$-lactose. It is reported by many researchers that the $\alpha$-lactose molecule is combined with one molecule of water of crystallization to form the lactose crystal.

It was customary to produce the quickly dissolving powdery milk by special spray drying method or freeze drying method. But, the conventional method gives rise to the defects described in the following. First of all, any of the conventional methods requires large facilities and large quantities of energy, leading to a high manufacturing cost of the quickly dissolving powdery milk, compared with the ordinary powdery milk. Secondly, drying is performed in two stages in the special spray drying method to promote conversion of the powder particles into crumb structure and to facilitate crystallization of lactose. The two-stage drying makes the total heating time of the milk components considerably longer than the heating time in the ordinary spray drying method. In addition, water is evaporated in the second stage drying step at considerably high temperatures (more than 100° C.), with the result that the milk components tend to be thermally denaturalized. A third defect is that the quickly dissolving powdery milk produced by the conventional freeze drying method cannot be preserved satisfactorily for a long period of time. Specifically, major portion of the fats and oils contained in the ordinary powdery milk is coated with milk proteins such as casein. However, major portion of the fats and oils contained in the quickly dissolving powdery milk produced by the freeze drying method is not coated, but is exposed to the atmosphere, with the result that the fats and oils are rapidly spoiled, leading to a low preservation capability mentioned above.

Powdery milk is used for producing a substitutive powdery milk composition which is used in place of or in combination with whole milk as feedstock of calves. The substitutive milk composition is powdery during transportation and storage, and is dissolved in cool or warm water when fed to calves. Thus, it is desirable for the substitutive milk composition to dissolve in water easily.

A quickly dissolving substitutive milk composition may be produced by using as a main component the quickly dissolving powdery milk converted from powdery skim milk. Specifically, the composition may be produced by mixing with the main component other components such as dry whey, animal fats, and livestock feed having fish solubles adsorbed thereon. Of course, the other components should desirably be readily soluble in water, also. It is also possible to produce the quickly dissolving substitute milk composition by the method equal to the method of producing the quickly dissolving powdery milk, using a solution containing both powdery skim milk and the other components. However, the conventional method of producing a quickly dissolving powdery milk is employed in each of the two cases described above, with the result that the three defects mentioned previously, i.e., high manufacturing cost, thermal denaturalization of milk components, and spoiling of fats and oils, remain unsolved. Moreover, the defects of manufacturing cost and thermal denaturalization are more serious in the substitutive milk composition.

Specifically, the high manufacturing cost of the substitutive milk composition gives serious economic damage to the livestock breeder. On the other hand, thermal denaturalization of the milk components is quite undesirable in nutritive and physiological aspect of the calf. Specifically, casein contained in the powdery milk is known to be coagulated under the action of rennin, i.e., a digestive enzyme, within the fourth stomach of a calf before the ruminating stage to form a so-called "curd". The curd is gradually transferred into the small intestines to be digested and absorbed. The time to form the curd within the fourth stomach and hardness of the formed curd are known to be particularly important in nutritive and physiological aspect of the calf. It is also known that the curd-forming ability of the powdery milk depends on the quality of casein contained in the powdery milk. If a powdery milk is heated to temperatures above 75° C., casein contained therein is known to be denaturalized, leading to a low curd-forming ability. What should be noted is that, if a normal curd is not formed, the substitutive milk composition is promptly transferred from the fourth stomach into the small intestines. Naturally, the small intestines are caused to bear an excessive load, leading to scours and abortion of the calf. To be brief, various difficulties accompany to the production of a quickly dissolving substitutive milk composition.

SUMMARY OF THE INVENTION

An object of this invention is to provide a method of producing at a low cost a powdery instant milk and a substitutive powdery instant milk composition of high quality without requiring large quantities of energy and without involving heating at high temperatures.

According to this invention, there is provided a powdery instant milk composition of crumb structure, said composition containing 0.5 to 3% by weight of propylene glycol.

There is also provided a method of producing a powdery instant milk composition, comprising the steps of adding propylene glycol to a powdery milk or substitutive powdery milk composition and kneading the mixture to form lumps of crumb structure, and pulverizing the lumps into particles of prescribed size.

BRIEF DESCRIPTION OF THE DRAWING

FIG. 1 is a graph showing the weight increase caused by water absorption for the case where powdery skim milk was kneaded with propylene glycol added thereto (embodiment of the present invention), and the case where powdery skim milk was kneaded with no addition of propylene glycol (control case); and FIG. 2 is a graph showing the weight increase caused by water absorption for the case where a substitutive powdery milk composition was kneaded with propylene glycol added thereto (embodiment of the present invention), and the case where a substitutive powdery milk composition was kneaded with no addition of propylene glycol (control case).

DETAILED DESCRIPTION OF THE PREFERRED EMBODIMENT

The quickly dissolving powdery milk composition of the present invention may comprise only milk powder. It is possible to add other nutritious materials, vitamins, etc. to the composition. A substitutive powdery milk composition used as a livestock feed, which is prepared by adding dry whey, animal fats and oils, and fish soluble-adsorbed livestock feed to a main component of powdery skim milk, is also included in the quickly dissolving powdery milk composition of the present invention.

Any kind of powdery milk produced, for example, by the ordinary spray drying method such as powdery skim milk, powdery whole milk and dry whey may be employable as a raw milk powder. Also, any kind of substitutive powdery milk composition available on the market, which is prepared by adding dry whey, animal fats and oils, and fish soluble-adsorbed livestock feed to a main component of powdery skim milk produced by the ordinary spray drying method, may be employable as a raw material. The substitutive composition may also contain sugars, vitamins, inorganic materials, etc.

Propylene glycol used in the present invention is legally designated as a food additive and brings about no problem in safety. As apparent from the Examples described later, propylene glycol is added in such a small amount as 0.5 to 3%, preferably 0.8 to 2.0%, by weight in the present invention, with the result that no problem is given to the powdery milk or substitutive powdery milk composition.

In the present invention, propylene glycol is added to powdery milk or substitutive powdery milk composition, and the mixture is kneaded by using, for example, a kneading mixer so as to achieve uniform dispersion of propylene glycol. During the kneading process, the powdery mass is gradually rendered viscous and rapidly increased in volume. If the kneading is further continued, viscosity of the kneaded mass is rapidly lowered about 3 to 5 minutes later depending on the added amount of propylene glycol so as to form a granular mass of loose crumb structure. The granular mass is pulverized and then sieved or passed through granulating rolls, if necessary, so as to produce a granular product of uniform particle size. As apparent from the Examples described later, the granular product is readily soluble in cold or warm water.

Reasons for the granular product of the present invention being readily soluble in water are thought to be as follows. First of all, the single grain structure of the powdery mass is converted by the treatment of the present invention into the crumb structure, enabling the treated mass to have a large capillary space. This is recognized by the fact that the powdery mass is rapidly expanded in volume during the kneading process. Also, the porosity measured in the Examples described later supports the change into the crumb structure. Naturally, propylene glycol added to the powdery mass is thought to perform the function of a binder which promotes the change of the powdery mass structure into the crumb structure.

Secondly, $\alpha$-lactose contained in the powdery milk or substitutive powdery milk composition is thought to be combined with water of crystallization during the treatment of the present invention. It should be noted in this connection that, during the kneading process of the powdery mass mixed with propylene glycol, the powdery mass is rendered viscous and rapidly gains weight because the moisture absorbing power of propylene glycol is so large that the water within the air is absorbed by the powdery mass. What should also be noted is that the weight increase is completely stopped after the powdery mass has lost its viscosity and has been transformed into lumps. Addition of propylene glycol gives no influence to the change of weight thereafter. Further, the weight increased by the water absorption is not lost later. It is impossible to explain these facts simply by the moisture absorption of propylene glycol. It is supposed that the absorbed water is combined with $\alpha$-lactose as water of crystallization so as to bring about crystallization of $\alpha$-lactose. It follows that propylene glycol added in the present invention is thought not only to act as a binder but also to absorb water from the air so as to provide water of crystallization in $\alpha$-lactose.

As described above in detail, a quickly dissolving powdery milk or substitutive powdery milk composition of the present invention can be produced by simply kneading powdery milk or substitutive powdery milk composition of single grain structure together with a small amount of propylene glycol. Naturally, special spray drying facilities or freeze drying facilities used in the conventional method are not required in the present invention. In addition, a large quantity of energy is not required in the present invention. It follows that it is possible to produce at low cost the quickly dissolving powdery milk and substitutive powdery milk composition.

Also, a heating step is not involved in the method of the present invention. Of course, it is impossible for the milk components to be thermally denaturalized, making it possible to provide a quickly dissolving powdery milk and substitutive powdery milk composition of good quality.

Further, the fats and oils contained in the product of the present invention are not exposed to the atmosphere unlike those contained in the product of the freeze drying method, with the result the product of the present invention can be preserved stably for a long period of time.

Needless to say, the quickly dissolving powdery milk of the present invention may be mixed with other components, e.g., powdery fats and oils, vitamins, minerals, etc. Of couse, the mixture quickly dissolves in water.

EXAMPLE 1

Powdery skim milk mixed with 1% by weight of propylene glycol was kneaded with a kneading mixer under a temperature of 24° C. and a relative humidity of 53% to form kneaded mass of crumb structure. Then, the kneaded mass was pulverized to obtain a quickly dissolving powdery skim milk.

EXAMPLE 2

A quickly dissolving powdery skim milk was produced as in Example 1, except that the amount of propylene glycol added was 2% by weight.

EXAMPLE 3

A quickly dissolving powdery skim milk was produced as in Example 1, except that the amount of propylene glycol added was 3% by weight.

CONTROL 1

Powdery skim milk alone was kneaded with a kneading mixer under the same atmosphere as in Example 1.

Table 1 and FIG. 1 show the change with time in the weight of the kneaded mass prepared in each of Examples 1 to 3 and Control 1. The value shown in Table 1 and FIG. 1 denotes the percentage of weight increase. Results of the experiment imply that the propylene glycol added to the powdery skim milk rapidly absorbed water contained in the air and the absorbed water was combined with α-lactose so as to bring about crystallization of α-lactose.

TABLE 1

| Lapse of time (minutes) | Control 1 | Example 1 | Example 2 | Example 3 |
| --- | --- | --- | --- | --- |
| 0 | 3.23% | 3.23% | 3.23% | 3.23% |
| 3 | 3.27 | 3.75 | 4.05 | 4.32 |
| 5 | 3.28 | 3.89 | 4.16 | 4.58 |
| 10 | 3.30 | 3.93 | 4.22 | 4.65 |
| 15 | 3.32 | 3.97 | 4.28 | 4.68 |
| 30 | 3.39 | 4.00 | 4.33 | 4.72 |
| 60 | 3.48 | 4.05 | 4.39 | 4.77 |
| 120 | 3.55 | 4.12 | 4.47 | 4.82 |
| 180 | 3.62 | 4.20 | 4.54 | 4.88 |

Room Temperature: 24° C.
Relative Humidity: 53%

Table 2 shows the porosity of the products of Examples 1 to 3 and Control 1 determined by the following formulas:

$$\text{Porosity} = 1 - \frac{\text{apparent specific gravity of product}}{\text{true specific gravity of product}}$$

TABLE 2

| Mesh pore size (mm) | Particle size | Control 1 | Example 1 | Example 2 | Example 3 |
| --- | --- | --- | --- | --- | --- |
| | mesh STD. | 0.142 | — | — | — |
| 2.00~0.84 | 10~20 | — | 0.308 | 0.324 | 0.342 |
| 0.84~0.59 | 20~30 | — | 0.299 | 0.318 | 0.331 |
| 0.59~0.42 | 30~40 | — | 0.290 | 0.306 | 0.328 |
| 0.42~0.25 | 40~60 | — | 0.281 | 0.301 | 0.320 |
| 0.25 | more than 60 | — | 0.269 | 0.297 | 0.310 |

It is seen from Table 2 that the products of Examples 1 to 3 are of crumb structure.

20 g each of the products of Examples 1 to 3 and Control 1 was put in 250 ml of water of 20° C., 25° C., 30° C. and 35° C. while keeping the water stirred. Table 3 shows the time for the product to be completely dissolved in the water.

TABLE 3

| Dissolving conditions | | Dissolving time (min:sec) | | | |
| --- | --- | --- | --- | --- | --- |
| Water temp. | Rotation speed | Control 1 | Example 1 | Example 2 | Example 3 |
| 20° C. | 500 rpm | more than 10 min | 7:00 | 2:55 | 2:00 |
| | 750 | more than 10 min | 3:25 | 1:30 | 1:00 |
| 25 | 500 | more than 10 min | 6:30 | 2:00 | 1:50 |
| | 750 | more than 10 min | 3:00 | :50 | :40 |
| 30 | 500 | more than 10 min | 5:40 | 1:40 | 1:30 |
| | 750 | 6:00 | 2:20 | :35 | :30 |
| 35 | 500 | more than 10 min | 4:50 | 1:20 | 1:00 |
| | 750 | 5:00 | 2:00 | :20 | :15 |

It is seen from Table 3 that the products of Examples 1 to 3 are promptly dissolved in water.

Then, 20 g of the product of Control 1 was put in 250 ml of water of 30° C. containing 1% by weight of propylene glycol and kept stirred at 750 rpm. The experiment was repeated twice with 2% and 3% by weight of propylene glycol added to the water, respectively. In each of these experiments, the dissolving time of the product of Control 1 was found to be 6 minutes in spite of the difference in the amount of propylene glycol added to the water. It follows that the high solubility in Examples 1 to 3 was not derived from the dissolving action of propylene glycol itself.

EXAMPLE 4

A substitutive powdery milk composition shown in Table 4, which was mixed with 1% by weight of propylene glycol, was kneaded with a kneading mixer under a temperature of 24° C. and a relative humidity of 53% to form kneaded mass of crumb structure. Then, the kneaded mass was pulverized to obtain a quickly dissolving substitutive powdery milk composition.

TABLE 4

| | |
| --- | --- |
| Powder Skim Milk | 70% |
| Dry Whey | 10% |
| Animal Fats and Oils | 15% |
| Fish Soluble-Adsorbed | 5% |

EXAMPLE 5

A quickly dissolving substitutive milk composition was produced as in Example 4, except that the amount of propylene glycol added was 2% by weight.

Example 6

A quickly dissolving substitutive milk composition was produced as in Example 4, except that the amount of propylene glycol added was 3% by weight.

CONTROL 2

The composition shown in Table 4 was kneaded with a kneading mixer under the same atmosphere as in Example 4, with no propylene glycol added to the composition.

Table 5 and FIG. 2 show the change with time in the weight of the kneaded mass prepared in each of Examples 4 to 6 and Control 2. The value shown in Table 5 and FIG. 2 denotes the percentage of weight increase. Results of the experiment imply that the propylene glycol added to the powdery skim milk rapidly absorbed water contained in the air and the absorbed water was combined with α-lactose so as to bring about crystallization of α-lactose.

TABLE 5

| Lapse of time (minutes) | Control 2 | Example 4 | Example 5 | Example 6 |
| --- | --- | --- | --- | --- |
| 0 | 3.76% | 3.76% | 3.76% | 3.76% |
| 3 | 3.78 | 4.15 | 4.52 | 4.70 |
| 5 | 3.79 | 4.26 | 4.66 | 4.89 |
| 10 | 3.81 | 4.30 | 4.71 | 4.95 |
| 15 | 3.83 | 4.32 | 4.74 | 4.97 |
| 30 | 3.89 | 4.37 | 4.79 | 5.04 |
| 60 | 3.96 | 4.44 | 4.87 | 5.13 |
| 120 | 4.03 | 4.50 | 4.96 | 5.22 |
| 180 | 4.09 | 4.57 | 5.03 | 5.29 |

Room Temperature: 24° C.
Relative Humidity: 53%.

Table 6 shows the porosity of the products of Examples 4 to 6 and Control.

TABLE 6

| Mesh pore size (mm) | Particle size | Control 2 | Example 4 | Example 5 | Example 6 |
| --- | --- | --- | --- | --- | --- |
| | mesh STD. | 0.136 | — | — | — |
| 2.00~0.84 | 10~20 | — | 0.279 | 0.281 | 0.293 |
| 0.84~0.59 | 20~30 | — | 0.276 | 0.277 | 0.291 |
| 0.59~0.42 | 30~40 | — | 0.268 | 0.272 | 0.285 |
| 0.42~0.25 | 40~60 | — | 0.257 | 0.265 | 0.282 |
| 0.25 | more than 60 | — | 0.249 | 0.264 | 0.281 |

It is seen from Table 6 that the products of Examples 4 to 6 are of crumb structure.

20 g each of the products of Examples 4 to 6 and Control 2 was put in 250 ml of water of 20° C., 25° C., 30° C. and 35° C. while keeping the water stirred. Table 7 shows the time for the product to be completely dissolved in water.

TABLE 7

| Dissolving conditions | | Dissolving time (min:sec) | | | |
| --- | --- | --- | --- | --- | --- |
| Water temp. | Rotation speed | Control 2 | Example 4 | Example 5 | Example 6 |
| 20° C. | 500 rpm | more than 10 min | 8:10 | 4:00 | 3:30 |
| | 750 | more than 10 min | 4:00 | 2:50 | 2:10 |
| 25 | 500 | more than 10 min | 7:20 | 3:20 | 3:00 |
| | 750 | more than 10 min | 3:35 | 2:10 | 1:50 |
| 30 | 500 | more than 10 min | 6:00 | 2:25 | 1:55 |
| | 750 | more than 10 min | 3:00 | 2:25 | 1:55 |
| 35 | 500 | more than 10 min | 5:05 | 2:00 | 1:30 |
| | 750 | 8:30 | 2:40 | :45 | :40 |

It is seen from Table 7 that the products of Examples 1 to 3 are promptly dissolved in water.

As described above in detail, the present invention provides a quickly dissolving powdery milk and substitutive powdery milk composition of high quality and a method of producing the same at a low cost.

What is claimed is:

1. A powdery instant milk composition having a crumb structure, which contains 0.5 to 3% by weight of propylene glycol.

2. The powdery instant milk composition of claim 1 wherein the propylene glycol is included in an amount of 0.8 to 2.0% by weight.

3. A method of producing a powdery instant milk composition, comprising the steps of adding propylene glycol in an amount of 0.5 to 3% by weight to a powdery milk composition, kneading the mixture to form lumps having a crumb structure, and pulverizing the lumps into particles of prescribed size.

4. The method of claim 3 wherein each of said steps is conducted at ambient temperature.

5. The method of claim 6 wherein said powdery instant milk composition further comprises at least one nutrient material.

6. The method of claim 5, wherein said at least one nutrient material is selected from the group consisting of dry whey, vitamins, animal fats, animal oils, and fish soluble-adsorbed livestock feed.

7. The method of claim 4 wherein the amount of propylene glycol is 0.8 to 2.0% by weight.

8. The method of claim 3 wherein said powdery instant milk composition further comprises at least one nutrient material.

9. The method of claim 8, wherein said at least one nutrient material is selected from the group consisting of dry whey, vitamins, animal fats, animal oils, and fish soluble-adsorbed livestock feed.

10. The method of claim 9 wherein the amount of propylene glycol is 0.8 to 2.0% by weight.

11. The method of claim 8 wherein the amount of propylene glycol is 0.8 to 2.0% by weight.

12. The method of claim 3 wherein the amount of propylene glycol is 0.8 to 2.0% by weight.

13. The powdery instant milk composition of claim 1 further comprising at least one nutrient material.

14. The powdery instant milk composition of claim 13 wherein said at least one nutrient material is selected from the group consisting of dry whey, vitamins, animal fats, animal oils, and fish soluble-adsorbed livestock feed.

* * * * *

UNITED STATES PATENT AND TRADEMARK OFFICE
CERTIFICATE OF CORRECTION

PATENT NO. : 4,496,604
DATED : January 29, 1985
INVENTOR(S) : Tooichi OTSUBO

It is certified that error appears in the above-identified patent and that said Letters Patent is hereby corrected as shown below:

Column 8 (claim 5), line 40, change "claim 6" to read --claim 4--.

Signed and Sealed this

Thirty-first Day of December 1985

[SEAL]

Attest:

DONALD J. QUIGG

Attesting Officer     Commissioner of Patents and Trademarks